United States Patent
Ventz et al.

(10) Patent No.: US 9,120,626 B2
(45) Date of Patent: Sep. 1, 2015

(54) CURVED BELT CONVEYOR AND CHAIN FOR THE CONVEYOR

(75) Inventors: Kai Ventz, Hildesheim (DE); René Schällig, Hildesheim (DE)

(73) Assignee: TRANSNORM SYSTEM, GmbH (DE)

( * ) Notice: Subject to any disclaimer, the term of this patent is extended or adjusted under 35 U.S.C. 154(b) by 0 days.

(21) Appl. No.: 14/232,927

(22) PCT Filed: Jul. 19, 2011

(86) PCT No.: PCT/EP2011/003592
§ 371 (c)(1),
(2), (4) Date: Jan. 15, 2014

(87) PCT Pub. No.: WO2013/010558
PCT Pub. Date: Jan. 24, 2013

(65) Prior Publication Data
US 2014/0166444 A1    Jun. 19, 2014

(51) Int. Cl.
*B65G 15/02* (2006.01)
*B65G 21/22* (2006.01)

(52) U.S. Cl.
CPC .............. *B65G 15/02* (2013.01); *B65G 21/22* (2013.01)

(58) Field of Classification Search
CPC ........ B65G 15/02; B65G 17/02; B65G 17/44; B65G 17/385; B65G 17/068; B65G 17/066; B65G 21/16; B65G 21/22; B65G 39/20
USPC .................................................. 198/831, 838
See application file for complete search history.

(56) References Cited

U.S. PATENT DOCUMENTS

| | | | | |
|---|---|---|---|---|
| 2,234,537 A * | 3/1941 | Blackburn | ..................... | 198/831 |
| 3,265,193 A * | 8/1966 | Bessant | ..................... | 198/834 |
| 4,202,443 A * | 5/1980 | Buhrer | ..................... | 198/831 |
| 4,846,338 A * | 7/1989 | Widmer | ..................... | 198/831 |
| 6,843,366 B2 * | 1/2005 | Shiotani | ..................... | 198/831 |
| 7,044,290 B2 * | 5/2006 | Garbagnati et al. | ..................... | 198/852 |
| 7,546,916 B2 * | 6/2009 | Jenny | ..................... | 198/831 |
| 8,701,874 B2 * | 4/2014 | Knigge et al. | ..................... | 198/831 |
| 2010/0108474 A1 * | 5/2010 | Knigge et al. | ..................... | 198/805 |

FOREIGN PATENT DOCUMENTS

| | | |
|---|---|---|
| EP | 0448779 | 10/1991 |
| EP | 1433724 | 6/2004 |
| EP | 2082978 | 1/2008 |
| FR | 2650811 | 8/1989 |
| GB | 2057999 | 4/1981 |

OTHER PUBLICATIONS

International Search Report for PCT EP/2011/003592 dated May 8, 2012.

* cited by examiner

*Primary Examiner* — Leslie A Nicholson, III
*Assistant Examiner* — Keith R Campbell
(74) *Attorney, Agent, or Firm* — Kenneth F. Pearce

(57) ABSTRACT

A curved belt conveyor includes a circulating transport belt. The transport belt is connected to the outer side of the curved belt conveyor provided with a chain. The chain has guides guided by guide elements of the curved belt conveyor. Among other things, the guides are detachable from the chain and can be constructed as a roller or a wearing part.

21 Claims, 4 Drawing Sheets

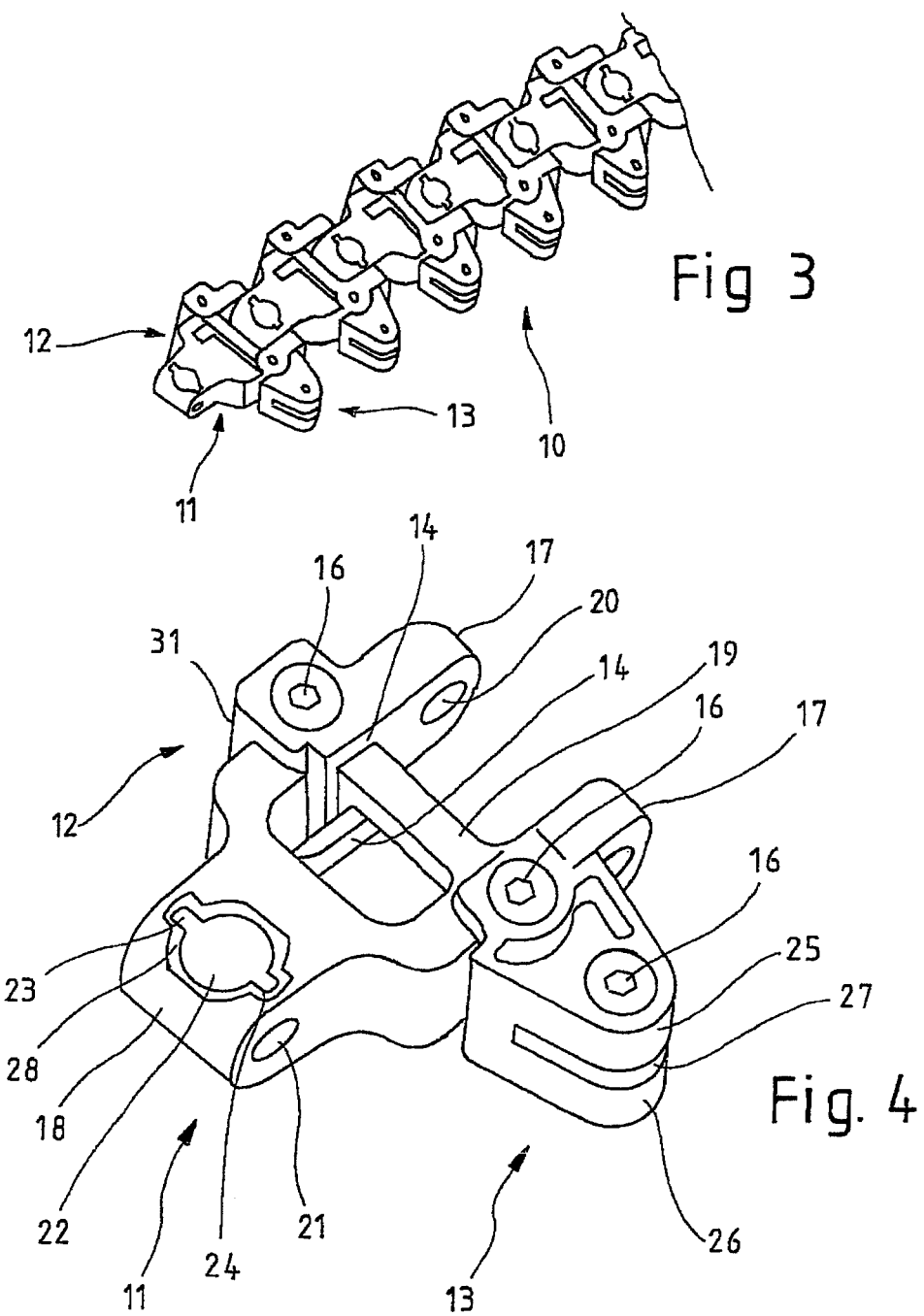

CURVED BELT CONVEYOR AND CHAIN FOR THE CONVEYOR

The invention relates to a curved belt conveyor with a circulating transport belt, wherein the transport belt is connected to a chain on the outer side of the curved belt conveyor and the chain has guide means whose guide elements are guided on the curved belt conveyor. The invention further relates to a chain for such a curved belt conveyor.

A species-related curved belt conveyor is known from EP 1 433 724 B1. This curved belt conveyor traverses an angle of 90 degrees and is constructed with a curved endless belt in the interior thereof, to which an endless drive chain is connected on the outside. This drive chain is constructed from unit elements having a specific geometry that enables the chain links to move so that the chain is curved in the same way as the endless belt at the outer circumference of the endless belt. The chain is guided in that end parts of the unit elements are guided in guide rails of the conveyor device.

Another curved belt conveyor is known for example from EP 0 448 779 A1. In this document, a curved belt conveyor is described that encloses an angle of 90 degrees or a different angle. The conveyor belt is connected to an endless chain at the outer radius of the belt and is driven via the endless chain, the endless chain being guided via upper and lower guide elements that are constructed from suitable plastic material. The document describes how these guide devices are separated from each other and insulated to prevent the transfer of vibration forces.

It is an aspect of the present invention to provide a curved belt conveyor that is particularly simple and inexpensive to.

Advantageous preferred embodiments of the invention are described herein.

In a curved belt conveyor with a circulating transport belt, in which the transport belt is connected to the outer side of the curved belt conveyor by a chain and the chain has guide means that are guided on the curved belt conveyor in guide elements, it is essential for the purposes of the invention that the guide means are attached to the chain in detachable manner. This enables the guide means to be replaced easily and inexpensively when they become worn. Thus, the chain is constructed in modular fashion, so that the chain with central chain links remains in place and wearing parts may be replaced or the order thereof may be changed. Because they are fixed in detachable manner, the type of the guide means may also be changed.

For example, in principle is it possible to construct the guide means in the form of a roller. Alternatively, the guide means may be constructed as a wearing part, in a different embodiment. In this case, such a wearing part may particularly be guided on the outer side of the guide elements and may thus also be guided on the guide elements by friction forces, thus absorbing a lateral load. As a result of the invention, it is possible to replace the wearing part when it becomes correspondingly worn, or to replace with a different guide means, for example to convert it from a mechanically guided friction means to a roller.

The chain is preferably constructed with a central chain link that has a detachable connecting element on each side, and a transport belt connector may be attached to one side and the guide means to the other. In this arrangement, the chain link itself is preferably symmetrical and the connecting elements are preferably constructed as cylindrical cutouts with a guide groove into which cylindrical mating parts may be introduced and are preferably constructed as snap-in connections. The groove in the cylindrical cutout and a corresponding mating part also enable the elements to be secured against twisting. The chain is preferably made from plastic. The central chain link is preferably made entirely from plastic as well. The connections between the individual chain links are preferably assured via a pin that connects all of the chain links to each other, and which is preferably manufactured from a metal material. The chain preferably comprises individual chain links that are connected via a pin, the pin being permanently secured in a chain link and passing through a cutout in the next chain link, the diameter of the cutout being greater than the diameter of the pin, so that the pin is able to tilt in the cutout both in plane of the chain and perpendicularly to the plane of the chain. This design makes is possible for the chain to move in a direction other than a straight line, enabling a curving movement. The chain link is preferably constructed in the manner of a fork in the area accommodating the pin, so that the pin is seated non-rotatably between the two outer, fixed ends and is supported rotatably on the pin in the gap of the correspondingly narrower front section of the chain link. In this context, the distance from one pin to the next is roughly equal to the largest transverse dimension of the chain link. The distance from one pin to the next is preferably greater than the length of a pin. This enables greater flexibility. The length of a chain link is also greater than the width of the chain link. A bracing element is arranged in the chain link, particularly between and connecting the two prongs of the chain link, and extends perpendicularly to the direction of movement of the chain. The connecting elements for securing the guide means and the transport belt connector are arranged inside the prongs directly adjacent to this bracing element.

In a particularly preferred configuration, each chain link of the chain is furnished with a tilt limiter, which limits the extent to which the link may be tilted perpendicularly to the plane of the chain. In this way, it is possible for the individual tilting behaviour of the chain links relative to each other to be handled differently in the plane of the chain and perpendicularly to the plane of the chain. A greater tilting range is desirable in the plane of the chain, since the curved movement is essential here. On the other hand, excessive tilting in the direction perpendicular to this plane may cause problems. The tilt limiter is preferably constructed such that it is arranged on the pin, and for this purpose is furnished with a cutout having a smaller diameter than the diameter of the cutout in the chain link through which the pin passes. The tilt limiter is also furnished with limit stops to limit movement perpendicular to the plane of the chain. The tilt limiter is advantageously accommodated within the front area of the chain link.

A further aspect of the invention provides a chain for a curved belt conveyor connectable with a transport belt, wherein provision is made on the chain so that guide means may be secured detachably thereto. In a preferred configuration, the chain is already connected to the transport belt and is additionally furnished with the guide means.

The invention will now be described in greater detail with reference to preferred embodiment represented by the drawings.

FIG. 3 is a part of the chain used in the curved belt conveyor according to the invention.

FIG. 4 is a view of a chain link according to the invention.

Figure 1:
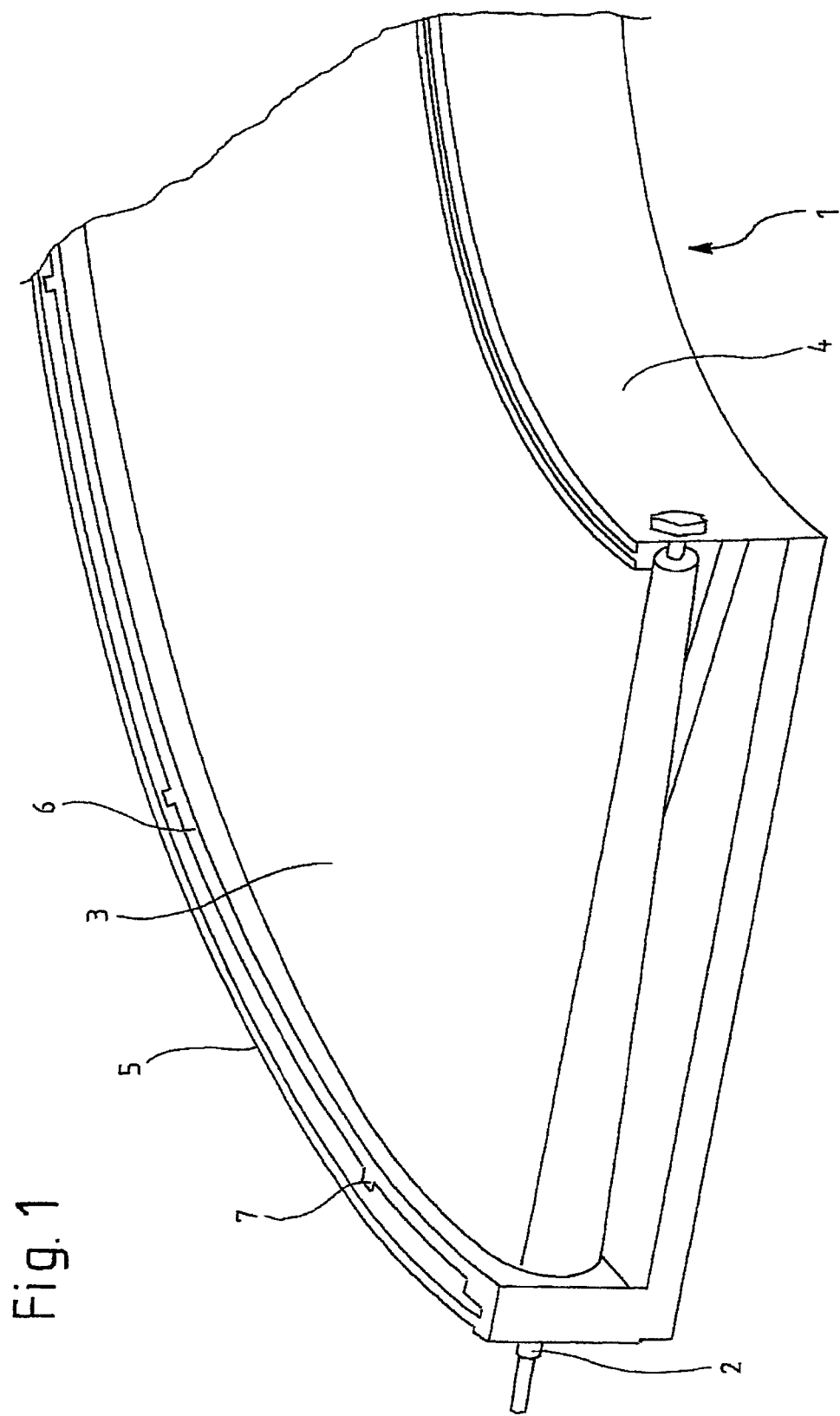
FIG. 1 is a schematic view of a curved belt conveyor according to the invention.

FIG. 1 shows a perspective view of a curved belt conveyor 1. This typically traverses an angle of 90 degrees, but in general may describe any other angle. The undercarriage of curved belt conveyor 1 is not shown here. Curved belt conveyor 1 essentially has a circulating transport belt 3, which is illustrated as an endless belt and in which a distinction is typically made between the upper run, circulating on top, and the returning lower run on the bottom. Each end of transport belt 3 is guided over a roller 2. Curved belt conveyor 1 is equipped with an inner frame section 4 and an outer frame section 5. In the present invention, drive and guidance for transport belt 3 is provided via a chain circulating on the outside, not shown here. Since it might be possible for the items being transported to become trapped in the chain with undesirable consequences, a cover 6 is provided over transport belt 3 so that chain, which is connected to transport belt 3 in order to drive transport belt 3, circulates between cover 6 and outer housing element 5. Cover 6 is attached to outer housing element 5 via retaining elements 7.

Figure 2:
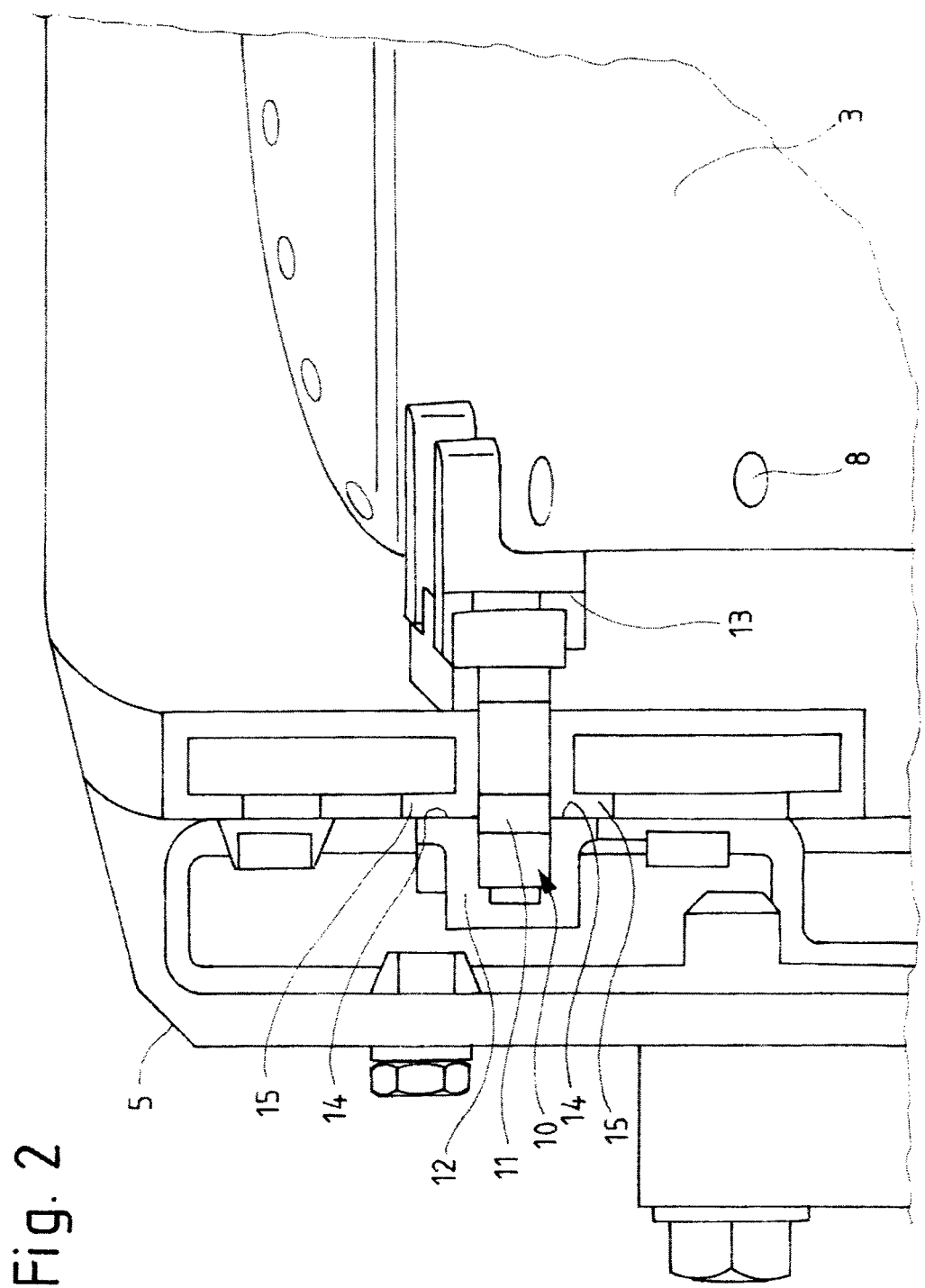
FIG. 2 is a cross section through the area of the outer wall of a curved belt conveyor according to the invention.

FIG. 2 shows a cross-section through the area of the outer periphery of curved belt conveyor 1. A section of transport belt 3 is shown on the right of the figure. Cutouts 8 are provided at regular intervals along the edge of the belt, and serve to connect it to a chain 10, which is attached to transport belt 3 and also guides the transport belt 3 attached thereto on the outside of curved belt conveyor 1. The chain also runs over a toothed wheel arranged on roller 2, and is driven thereby. In principle, it is also possible to provide driving power for the chain alternatively or additionally via toothed wheels at other positions. However, this may be realised simply by arranging the toothed wheel on the axle of roller 2, which is already present. Chain 10 comprises three different parts, a central chain link 11, a guide means 12, and a transport belt connector 13. Guide means 12 and transport belt connector 13 are attached detachably to the symmetrically constructed chain link 11. Central chain link 11 thus serves essentially to receive the traction forces exerted on the chain and to advance over allocated drive means, particularly toothed wheels. Transport belt connector 13 serves to connect chain 10 to transport belt 3, wherein transport belt connector 13 preferably clasps transport belt from above and below in the manner of a fork and has a pin that passes through the upper and lower fork tines, the pin passing through a corresponding cutout 8 in transport belt 3 and thus holding it securely in place. Guide means 12 is furnished with projecting friction surfaces 14 on the inner side thereof facing the outer areas of chain link 11, which surfaces serve as a contact support with a guide means 15, which is connected to outer frame section 5. The materials of friction surface 14 and the corresponding surfaces of guide element 15 are selected such that the coefficient of friction is as low as possible. In this context, these materials are preferably specially selected plastics. An outer zone 28 of guide means 12 encloses central link 11 in the manner of a clamp and after being secured with connecting pin 16 transitions upwardly and downwardly into guidance zones 29 with friction surfaces 14.

FIG. 3 is a perspective view of a chain 10 having a plurality of chain links 11, each of which has guide means 12 and transport belt connectors 13 arranged thereon. FIG. 4 is an enlarged view of a single chain element. Central chain link 11 has a forked end section with two prongs 17 extending parallel and at a distance from one another, and in which the end section of each has a cutout 20 for accommodating a pin, preferably in non-rotating manner. To this end, at least the end area of the pin has a chamfer or notch or protrusion which correspondingly matches the respective geometrical shape in cutout 20, so that the pin is seated non-rotatable manner. At the opposite end, central chain link 11 is tapered to form a head 18 the width of which is smaller than the distance between prongs 17, such that this head 18 may be inserted between the prongs. A continuous cutout 21 is provided in the area of head 18 and serves to engage the pin retained in cutouts 20. The diameter of cutout 21 is larger than cutouts 20, with the result that head 18 is able to rotate about the pin. At the same time, cutout 21 is also large enough to allow head portion 18 to tilt, thus enabling the entire chain element to swivel in the plane of the chain and perpendicularly to the plane of the chain relative its neighbouring chain element, which makes curved guidance possible. In addition, central chain link 11 also has a bracing element 19 in the area of prongs 17 to strengthen the prongs. Connecting elements are provided in prongs 17 directly adjacent to bracing element 19, guide means 12 being attached to one side and transport belt connector 13 being attached to the other side thereof. The connector element itself is not shown here since it is covered by the guide means and transport connector referred to above. It is preferably conformed as a vertical slot in which guide means 12 or transport belt connector 13 may be retained detachably via a connecting pin 16. Transport belt connector 13 also has two forklike protrusions 25 and 26 that extend inwardly in the plane of the chain so that a slot 27 is formed between them, into which transport belt 3 (FIG. 2) may be inserted. The transport belt is attachable via a connecting pin 16 which is inserted through associated cutouts in protrusions 25 and 26. The three connecting pins 16 used on the chain element are preferably identical in design and construction, so that the number of parts required is reduced and assembly is simplified. In similar manner to guide means 12, transport belt connector 13 is attached detachably to central chain link 11. A tilt limiter 22 with end stops 23 is provided in a cutout 28 provided in front section 18 of chain link 11. The function of tilt limiter 22 will be described more closely with reference to FIG. 5.

Figure 5:
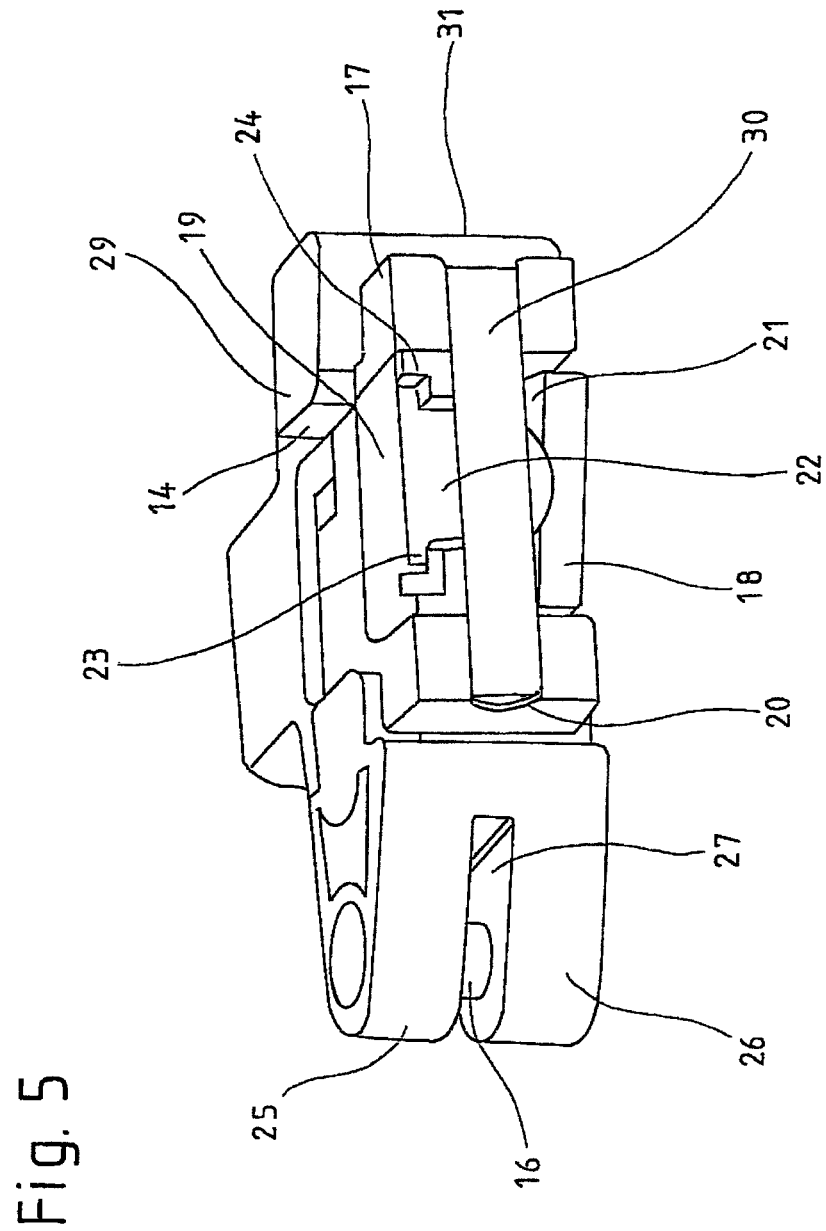
FIG. 5 is a cross section through a chain link according to the invention along the pin that connects the chain elements.

FIG. 5 shows a sectional view through a chain element according to the invention along a pin 30 that connects the chain elements. Pin 30 is arranged fixedly in cutout 20 of prongs 17 of central link 11. The diameter of cutout 21 in the head section of central chain link 11 is larger than cutout 20 so that tilting is possible. Tilt limiter 22 contacts pin 30 and has a diameter matching the diameter of pin 30, and thus tilts together with the pin. The tilt limiter 22 is furnished with limit stops 23 that strike associated tilt stops 24 inside cutout 28 in head section 18, in which tilt limiter 22 is located.

The invention claimed is:

1. A curved conveyor comprising:
   a) a frame comprising a guide element for guiding a conveyor belt; and
   b) a chain outward of said conveyor belt; said chain comprising:
      i) a plurality of links;
      ii) a plurality of belt connectors inward of said links; said belt connectors detachably connected with said conveyor belt and detachably connected with said links; and
      iii) a plurality of chain guides, outward of said links, detachably connected with said links, wherein said chain guides contact said guide element.

2. The curved conveyor of claim 1, wherein each said chain guide comprises:
   a) a roller; or
   b) a frictional projecting surface capable of corresponding with said guide element.

3. The curved conveyor of claim 2, wherein said chain guide bears a load relative to said guide element.

4. The curved conveyor of claim 3, wherein each link comprises:

a) a pin;
b) a cutout for receiving said pin, wherein a diameter of said cutout is larger than a diameter of said pin such that said pin can tilt in a direction of:
   i) a plane of said chain; and/or
   ii) a plane perpendicular to said chain.

5. The curved conveyor of claim 4, wherein each link comprises a limiter for limiting tilt in said plane perpendicular to said chain.

6. The curved conveyor of claim 5, wherein said limiter further comprises a stop for inhibiting said tilt in said plane perpendicular to said chain, and wherein said limiter is arranged on said pin.

7. The curved conveyor of claim 5, wherein a distance between said pins of adjacent links is greater than a length of each said pin.

8. The curved conveyor of claim 7, wherein each said link further comprises a brace extending between said chain guide and said belt connector.

9. The curved conveyor of claim 8, wherein said chain comprises plastic.

10. A chain guided along a guide element of a curved conveyor and a belt of a said curved conveyor; said chain comprising:
   a) a plurality of links;
   b) a plurality of chain guides, outward of said links, coacting with said guide element and bearing loads associated with coaction of said guide element and said chain guides, wherein said chain guides are detachably connected to outward sides of said links; and
   c) a plurality of belt connectors inward of said links; said belt connectors detachably connected with said conveyor belt and said links.

11. The chain of claim 10, wherein each said chain guide comprises:
   a) a roller; or
   b) a frictional projecting surface corresponding with said guide element.

12. The chain of claim 11, wherein each link comprises:
   a) a pin;
   b) a cutout receiving said pin, wherein a diameter of said cutout is larger than a diameter of said pin such that said pin can tilt in a direction of:
      i) a plane of said chain; and/or
      ii) a plane perpendicular to said chain.

13. The chain of claim 12 further comprising a limiter comprising a stop for inhibiting tilt in said plane perpendicular to said chain, wherein said limiter is associated with said pin.

14. The chain of claim 11, wherein each said link further comprises a brace extending between said chain guide and said belt connector.

15. A chain connectable to and detachable from a periphery of a belt of a curved conveyor including a guide element; said chain comprising:
   a) a plurality of links;
   b) chain guides proximate said periphery coacting with said guide element and bearing loads associated with coaction of said guide element and said chain guides, wherein each said chain guide is detachably connected to its corresponding chain link; and
   c) a belt connectors, opposed from said periphery, wherein each said belt connector is detachably connected with said belt and said links.

16. The chain of claim 15, wherein each said chain guide comprises:
   a) a roller; or
   b) a frictional projecting surface corresponding with said guide element.

17. The chain of claim 16, wherein each link comprises:
   a) a pin;
   b) a cutout receiving said pin, wherein a diameter of said cutout is larger than a diameter of said pin such that said pin can tilt in a direction of:
      i) a plane of said chain; and/or
      ii) a plane perpendicular to said chain.

18. The chain of claim 17 further comprising a limiter comprising a stop for inhibiting tilt in said plane perpendicular to said chain, wherein said limiter is associated with said pin.

19. The chain of claim 17, wherein each said link further comprises a brace extending between said chain guide and said belt connector.

20. A chain for moving a belt of a curved conveyor including a guide element; said chain comprising:
   a) a chain guide coacting with said guide element;
   b) a link, inward of said chain guide, detachably connected with said chain guide; and
   c) a belt connector, inward of said chain link, detachably connected with said belt and said link.

21. The chain of claim 20 further comprising:
   a) a roller; or
   b) a frictional projecting surface corresponding with said guide element.

* * * * *